(12) United States Patent  
Monpeurt et al.

(10) Patent No.: US 12,099,008 B2  
(45) Date of Patent: Sep. 24, 2024

(54) OPTICAL COMPONENT FOR AN ATR IMAGING DEVICE

(71) Applicant: COMMISSARIAT A L'ENERGIE ATOMIQUE ET AUX ENERGIES ALTERNATIVES, Paris (FR)

(72) Inventors: Cyrielle Monpeurt, Grenoble (FR); Mathieu Dupoy, Coublevie (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 469 days.

(21) Appl. No.: 17/644,639

(22) Filed: Dec. 16, 2021

(65) Prior Publication Data

US 2022/0196895 A1 Jun. 23, 2022

(30) Foreign Application Priority Data

Dec. 21, 2020 (FR) ...................... 20 13815

(51) Int. Cl.
*G01N 21/552* (2014.01)
*F21V 8/00* (2006.01)

(52) U.S. Cl.
CPC ......... *G01N 21/552* (2013.01); *G02B 6/0058* (2013.01); *G02B 6/0076* (2013.01)

(58) Field of Classification Search
CPC .. G02B 6/0038; G02B 6/0036; G02B 6/0076; G02B 6/0058; G02B 27/0944; G02B 5/1819; G01N 21/552
See application file for complete search history.

(56) References Cited

U.S. PATENT DOCUMENTS 6,335,793 B1 * 1/2002 Freeman ............ G01N 21/7703 356/477
6,545,759 B1 * 4/2003 Hartman ............ G01N 21/7703 356/477

(Continued)

FOREIGN PATENT DOCUMENTS

TW I696851 B 6/2020
WO WO 98/22807 A1 5/1998

(Continued)

OTHER PUBLICATIONS

French Preliminary Search Report issued Aug. 24, 2021 in French Application 20 13815 filed on Dec. 21, 2020, 3 pages (with English Translation of Categories of Cited Documents).

(Continued)

*Primary Examiner* — Zheng Song
(74) *Attorney, Agent, or Firm* — Oblon, McClelland, Maier & Neustadt, L.L.P.

(57) ABSTRACT

An optical component for an attenuated total reflection multispectral imaging device, which includes a support substrate and at least two planar waveguides, and wherein the planar waveguides and the support substrate are superimposed together, with the support substrate which covers the planar waveguides; each of the planar waveguides includes at least one diffraction grating; and at least two of the planar waveguides have their diffraction gratings which have values of the average pattern distribution pitch which are distinct from each other; the support substrate includes, on one side opposite the planar waveguides, a face forming an exchange interface with a sample; and an exit face of the optical component corresponds to a lateral face of the support substrate.

15 Claims, 3 Drawing Sheets

(56) References Cited

U.S. PATENT DOCUMENTS

| | | |
|---|---|---|
| 2010/0302798 A1 | 12/2010 | Papakonstantinou et al. |
| 2014/0260535 A1 | 9/2014 | McGill et al. |
| 2018/0164214 A1 | 6/2018 | Rottenberg et al. |
| 2019/0004324 A1 | 1/2019 | Wang et al. |
| 2021/0080629 A1 | 3/2021 | Tsai |

FOREIGN PATENT DOCUMENTS

| | | | | |
|---|---|---|---|---|
| WO | WO-2021240115 A1 | * | 12/2021 | ............. G01N 21/35 |
| WO | WO-2022187664 A1 | * | 9/2022 | ......... G02B 27/0081 |

OTHER PUBLICATIONS

Nicoletti et al., "Miniaturization of Mid-IR sensors on Si : challenges and perspectives", SPIE Proceedings, vol. 10923, Mar. 4, 2019, 10 pages.

Chan et al., "Attenuated total reflection Fourier-transform infrared (ATR-FTIR) imaging of tissues and live cells", Chem. Soc. Rev., 45, 2016, 16 pages.

\* cited by examiner

OPTICAL COMPONENT FOR AN ATR IMAGING DEVICE

TECHNICAL FIELD

The invention relates to the field of attenuated total reflection imaging, and more particularly relates to a component for carrying out the distribution of light to the sample and the collection of light from the sample. The attenuated total reflection imaging enables spectroscopic analyses to determine information relating to the chemical or biological composition of a sample. The analysis is based on the fact that each molecule has a characteristic absorption spectrum, for example in the infrared. Preferably, several distinct wavelengths are used, to improve the determination of the composition of the sample.

STATE OF THE PRIOR ART

Attenuated Total Reflection (ATR) multispectral imaging is a technique in which light is brought into a component attached to a sample to be analysed. The light is fully reflected at an interface between the component and the sample. A portion of the infrared light nevertheless penetrates inside the sample, in the form of an evanescent wave. A portion of this evanescent wave is absorbed by the sample. The light returned by the sample therefore includes information relating to the absorption by the sample. The image thus obtained can be used to determine a distribution of local chemical or biological compositions on the sample to be analysed, by exploiting the fact that each chemical or biological compound absorbs (and phase shifts) some frequencies of an incident radiation, with a specific signature allowing an identification (identification by spectroscopy, in particular infrared spectroscopy).

In the prior art, the component attached to the sample consists of a simple prism, transparent to the wavelengths sent into the sample. The light i is injected on an entrance face of the prism, circulates inside the prism to an exchange face of the latter, against which the sample is placed, then returns to an exit face of the prism, on the side opposite to the entrance face. Such a component is illustrated in the article "*Attenuated total reflection Fourier-transform infrared (ATR-FTIR) imaging of tissues and live cells*", K. L. Andrew Chan & al., Chem Soc Rev, pp. 1850-1864. The used light source is a polychromatic source, which allows for the multispectral imaging. A drawback is that for each considered wavelength, the polychromatic source offers only a low power density. It is therefore necessary, in order to obtain a multispectral image, to implement a scanning of the sample by the light beam. This results in a very long time to acquire a wide-field multispectral image of a sample.

An objective based on the invention is to propose means allowing reducing an acquisition time of a multispectral image of a sample, obtained by the attenuated total reflection multispectral imaging technique

DISCLOSURE OF THE INVENTION

This objective is achieved with an optical component for an attenuated total reflection multispectral imaging device, which includes a support substrate and at least two planar waveguides, and:
 each of the planar waveguides extends in a respective plane, with said respective planes parallel to each other and parallel to a plane of the optical component;
 the planar waveguides and the support substrate are superimposed together along an axis orthogonal to the plane of the optical component, with the support substrate which covers the planar waveguides;
 each of the planar waveguides includes at least one diffraction grating, to extract light out of said planar waveguide;
 at least two of the planar waveguides have their respective diffraction gratings which have values of the average pattern distribution pitch which are distinct from each other;

Each diffraction grating is configured to extract light out of said corresponding planar waveguide, in particular towards the support substrate.

In each planar waveguide, the average pattern distribution pitch in the diffraction grating defines a wavelength of the light which is extracted, out of said waveguide, by the diffraction grating, and in a determined extraction direction. This wavelength is called the extraction wavelength. In practice, the extraction wavelength is a wavelength associated with a planar waveguide, which the latter is intended to receive in circulation before sending it to a sample.

Preferably, each of the planar waveguides has its diffraction grating which has a value distinct from the average pattern distribution pitch. Each of the planar waveguides is then associated with a distinct value of the extraction wavelength, for the same considered extraction direction.

In use, the optical component is placed against a sample to be analysed, at an exchange interface which extends on the side opposite the planar waveguides. The exchange interface can simply consist of the upper face of the support substrate, on the side opposite the planar waveguides.

At least two of the planar waveguides are associated with different values of their extraction wavelength, in a considered extraction direction. Each of these planar waveguides is configured to guide the light at its associated extraction wavelength. In use, each of these planar waveguides receives the light at the extraction wavelength which is associated thereto, and guides this light to the diffraction grating. Said light is preferably infrared light. The invention is not, however, limited to a use with the infrared light, and also covers variations adapted for use with visible light, or light belonging to any other wavelength range. At the diffraction grating level, the light is extracted out of the planar waveguide, in particular towards the support substrate. The light extracted towards the support substrate propagates to the exchange interface mentioned above, and is reflected on this interface. The reflected light includes a wave that has passed through the sample in the form of an evanescent wave, in the vicinity of the exchange interface.

The optical component therefore plays the same role as the prism of the systems described in the introduction.

The constitution of the optical component, with several superimposed planar waveguides, allows each of the planar waveguides to be dedicated to receiving and sending a determined wavelength to the exchange interface. The optical component thus allows using, as a light source, a set of monochromatic light sources each sending a respective light beam at the input of a respective one of the planar waveguides. It thus allows using a plurality of monochromatic light sources, by replacing a single polychromatic light source. This allows benefiting from a high power spectral density for all wavelengths used to characterise the sample. Due to this high power spectral density, it is no longer necessary to concentrate light on a reduced surface. It is therefore possible to make a multispectral image of a large surface of a sample, without scanning the light on the sample. The optical component thus allows reducing an acquisition time of a multispectral image of a sample, obtained by the attenuated total reflection multispectral imaging technique.

The plurality of monochromatic light sources can comprise in particular a set of quantum cascade lasers (QCL).

Furthermore, the support substrate may include, on a side opposite to the planar waveguides, a face configured to form an exchange interface with a sample and to be incident to the light extracted from the planar waveguides.

In addition, an exit face of the optical component may correspond to a lateral face of the support substrate arranged so that the light extracted from the planar waveguides and reflected by total reflection in the support substrate at the face configured to form the exchange interface emerges from the optical component through this exit face.

Preferably, each of the planar waveguides includes a core layer interposed between two cladding layers, and in each of the planar waveguides, the at least one diffraction grating consists of high index portions and low index portions, with the high index portions made of the material of the core layer and the low index portions made of the material of the cladding layers.

In each of the planar waveguides, the at least one diffraction grating can have a local value of the fill factor which varies monotonically along an axis of propagation of the light in said planar waveguide and in the direction of propagation of the light along this axis, the local value of the fill factor thus gradually approaching the value 0.5, with the fill factor which designates a ratio between a surface occupied by the low index portion in a pattern of the diffraction grating and a total surface occupied by said pattern, said surfaces being defined in a cutting plane parallel to the plane of the optical component Advantageously, the planar waveguides are arranged in decreasing order of an associated extraction wavelength value, with the extraction wavelength value which decreases at the same time as the distance between the planar waveguide and the support substrate decreases.

Preferably, the support substrate is transparent to values of the extraction wavelength which are associated with the diffraction gratings of each of the planar waveguides.

Advantageously, a refractive index of the support substrate is greater than or equal to 3, at a maximum wavelength among extraction wavelengths associated with the diffraction gratings of each of the planar waveguides.

The support substrate advantageously includes an exit face oriented transverse relative to the plane of the optical component.

Preferably, in each of the diffraction gratings, the value of the average pattern distribution pitch is adapted to extract a light beam at a determined value of extraction wavelength, and according to an extraction angle defined relative to the normal to the plane of the optical component, with the same value of the extraction angle for all diffraction gratings and with said value of the extraction angle, modified by refraction at the entry into the support substrate, which is greater than a critical angle of total internal reflection at an interface between the support substrate and an external medium.

Said value of the extraction angle, modified by refraction at the entry into the support substrate, is greater than or equal to 45°.

Advantageously, the support substrate includes an exit face, oriented transverse relative to the plane of the optical component, with an angle between the plane of the optical component and said exit face, which is substantially equal to the value of the extraction angle modified by refraction at the entry into the support substrate, to within plus or minus 5°.

The optical component may further include a beam splitting layer, superimposed on the support substrate on the side opposite to the planar waveguides, transparent to extraction wavelength values associated with the diffraction gratings of each of the planar waveguides, and of refractive index distinct from that of the support substrate.

An optical system is also described, which includes an optical component, as well as a plurality of elementary light sources, where each elementary light source is optically coupled to a respective one of the planar waveguides and capable of emitting a monochromatic light beam of spectrum centred on an extraction wavelength value associated with said planar waveguide.

The optical system may further include a matrix detector, sensitive to extraction wavelength values associated with the different planar waveguides, and configured to receive light emerging from the support substrate after it has been emitted by the elementary light sources and has circulated in the optical component.

The optical system may further include a computer, configured to receive as input light intensity measurements provided by the matrix detector, and to output a multispectral image of a sample.

According to an advantageous embodiment, said optical component forms a first optical component, and the optical system further includes:
 a second optical component, with the first optical component and the second optical component which are spaced apart from each other and which have the respective exit faces thereof facing each other; and
 an optical splitter and two guide arms, with the optical splitter configured to distribute the light on each of the two guide arms, with a first one of the guide arms which is capable of guiding the light from the optical splitter to the first optical component and with a second one of the guide arms which is capable of guiding the light from the optical splitter to the second optical component;

and in which the first and second optical components can be configured and positioned symmetrically such that, when a sample intended to be analysed is disposed on the face configured to form the exchange interface of the first optical component and that a reference sample is disposed on the face configured to form the exchange interface of the second optical component, the light emerging from the exit face of the first optical component and the light emerging from the exit face of the second optical component can interfere and form an interference pattern for each wavelength in the space between the two optical components so as to be able to be detected by a matrix detector.

BRIEF DESCRIPTION OF THE DRAWINGS

The present invention will be better understood on reading the description of exemplary embodiments given for purely illustrative and non-limiting purposes, with reference to the appended drawings in which.

DETAILED PRESENTATION OF PARTICULAR EMBODIMENTS

In order to facilitate the reading, the axes of an orthonormal reference frame (Oxyz) are shown in the figures. The (Oz) axis designates a vertical axis. The (Ox) and (Oy) axes together define a horizontal plane.

Throughout the text, the term "infrared" refers to a portion of the light spectrum belonging to a spectral band ranging from 0.78 µm to 50 µm, more preferably from 2 µm to 14 µm (mid-infrared). Throughout the text, the term "visible" refers to a portion of the light spectrum belonging to a spectral band ranging from 0.35 µm to 0.78 µm excluded.

Throughout the text, a planar waveguide designates an optical guide element, capable of guiding the propagation of the light by successive reflections on flat faces which are parallel to each other (here, it is more particularly a refractive guide). In a planar waveguide, light is confined along one of the axes of the three-dimensional space, and free to propagate along the other two axes. A waveguide consists of a core, through which light circulates, and a cladding, ensuring a desired optical index difference between the core and a medium surrounding the core. In the case of a planar waveguide, a core layer is interposed between two cladding layers, and the light is guided into the core layer by successive reflections at the interfaces between the core layer and each respective one of the cladding layers.

Figure 1A:
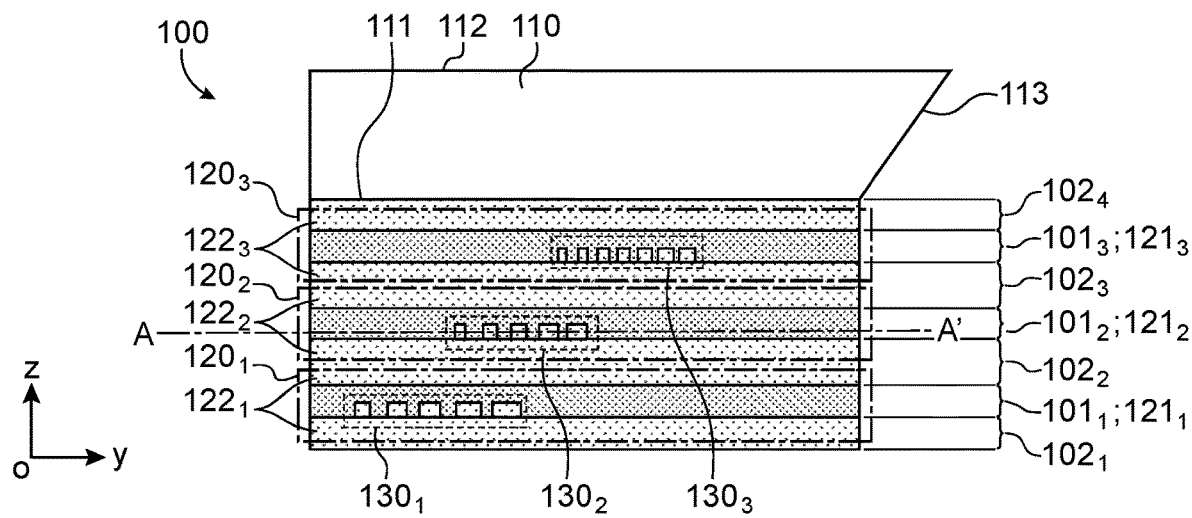
FIGS. 1A and 1B schematically illustrate, respectively in a sectional view in a vertical plane and in a sectional view in a horizontal plane, an optical component according to a first embodiment.
Figure 1B:
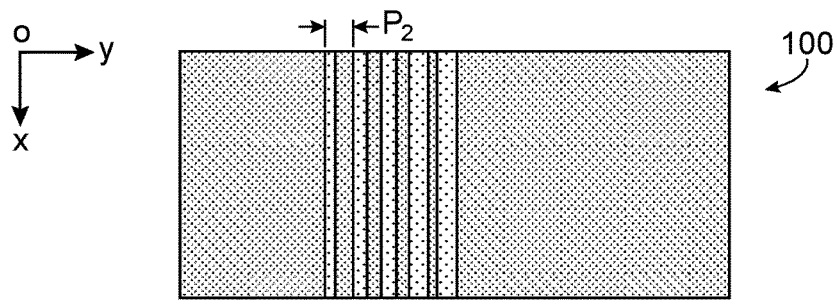

Firstly, with reference to FIGS. 1A and 1B, a first embodiment of an optical component 100 is described. FIG. 1A illustrates the optical component 100, in a sectional view along a plane parallel to the plane (Oyz). FIG. 1B illustrates the optical component 100 in a sectional view along a plane AA' parallel to the plane (Oxy).

The optical component 100 comprises:
a support substrate 110; and
a plurality of planar waveguides $120_1$, $120_2$, $120_3$, here three in number.

The support substrate 110 here consists of a silicon crystal. It is delimited in particular by two flat faces 111, 112 which extend parallel to the plane (Oxy), as well as by a transverse face 113 oriented obliquely relative to the plane (Oxy) and connecting the two flat faces 111 and 112.

The planar waveguides $120_1$, $120_2$, $120_3$ are formed in a stack consisting of high index layers $101_1$, $101_2$, $101_3$ and low index layers $102_1$, $102_2$, $102_3$, $102_4$ arranged alternately.

Here, this stack consists of an alternation of low index germanium-silicon alloy layers of (with preferably 40% germanium) and high index germanium layers. Alternatively, the high index layers and the low index layers are all made of an alloy of silicon and germanium, with a higher germanium content in the high index layers. Here, the high index and low index layers each have a homogeneous chemical composition, with a refractive index of the high index layers which is strictly greater than a refractive index of the low index layers (here at infrared wavelengths, for example at 3 µm or 8 µm). Alternatively, the high index layers and/or the low index layers may exhibit a non-homogeneous distribution of their chemical composition and of their refractive index. They can, for example, have a refractive index profile with a gradient. In any case, an average value of the refractive index in the low index layers is strictly lower than an average value of the refractive index in the high index layers.

Said high index and low index layers each extend in planes parallel to the plane (Oxy), and are superimposed on top of each other along the (Oz) axis. Likewise, the planar waveguides therefore each extend in planes parallel to the plane (Oxy), and are superimposed on top of each other along the (Oz) axis. The term "plane of the optical component" is used to refer to a plane parallel to the plane (Oxy).

Each of the planar waveguides $120_1$, $120_2$, $120_3$ includes a core layer $121_1$, $121_2$, respectively $121_3$, interposed between two cladding layers $122_1$, $122_2$, respectively $122_3$. Each core layer is formed by a respective one of the high index layers $101_1$, $101_2$, $101_3$. The cladding layers are each formed in one of the low index layers $102_1$, $102_2$, $102_3$, $102_4$. The upper cladding layer of a planar waveguide and the lower cladding layer of the planar waveguide located just above are then formed in the same low index layer (see layers $102_2$ and $102_3$). The thickness of said low index layer is adapted to limit losses by crosstalk between the two neighboring planar waveguides. Each of the planar waveguides $120_1$, $120_2$, $120_3$ is able to guide the light at at least one determined wavelength, here the infrared light.

The support substrate 110, and the stack of layers including the planar waveguides $120_1$, $120_2$, $120_3$, are superimposed together along the (Oz) axis. The support substrate 110 extends over the top of the stack, by covering the planar waveguides $120_1$, $120_2$, $120_3$. Here, the support substrate 110 is in direct physical contact with a low index layer belonging to the stack of layers, along a surface parallel to the plane (Oxy).

Each of the planar waveguides includes at least one diffraction grating $130_1$, $130_2$, respectively $130_3$, here a single diffraction grating.

Here, the diffraction gratings $130_1$, $130_2$, $130_3$ are formed in the core layer of the corresponding planar waveguide, on the side opposite to the support substrate 110. The invention is however not limited to this arrangement, the diffraction gratings may also extend into the core layer, on the side of the support substrate, or into the lower or upper cladding layer of the planar waveguide. The depth of a diffraction grating is advantageously less than or equal to half the thickness of the core or cladding layer in which it is formed, for example equal to a quarter of this thickness.

Each of the diffraction gratings $130_1$, $130_2$, $130_3$ consists of high index portions and low index portions, with the high index portions consisting of the material of the high index layers $101_1$, $101_2$, $101_3$, and with the low index portions consisting of the material of the low index layers $102_1$, $102_2$, $102_3$, $102_4$.

Each of the diffraction gratings $130_1$, $130_2$, $130_3$ extends in a plane (Oxy). Each of the diffraction gratings $130_1$, $130_2$, $130_3$ is here a one-dimensional grating, here with patterns invariant along the (Ox) axis. FIG. 1B illustrates the optical component 100, in a sectional view in a plane AA' parallel to the plane (Oxy), passing through the diffraction grating $130_2$. It shows patterns in the form of bars parallel to the axis (Ox).

In each of the planar waveguides, the diffraction grating $130_1$, $130_2$, respectively $130_3$ has an average pattern distribution pitch $P_1$, $P_2$, respectively $P_3$. Preferably, the pattern distribution pitch is constant over the entire extent of the diffraction grating. In any case, in each of the planar waveguides $120_1$, $120_2$, $120_3$, the diffraction grating has a value distinct from the average pattern distribution pitch. This value is adapted to extract the light out of said planar waveguide, at a specific wavelength called extraction wavelength, and in a determined extraction direction. Each diffraction grating, and therefore each planar waveguide, is therefore associated with a distinct value of the extraction wavelength. Preferably, all the diffraction gratings, and therefore all planar waveguides, are associated with the same extraction direction. Each of the diffraction gratings $130_1$, $130_2$, $130_3$ has a spectral width of about +/−200 nm around its extraction wavelength, which designates a range of wavelengths which is capable of extracting out of the plane (Oxy). Preferably, the extraction wavelengths associated with each respective one of the diffraction gratings $130_1$, $130_2$, $130_3$ are spaced in pairs by at least 400 nm.

Advantageously, the planar waveguides $120_1$, $120_2$, $120_3$ are arranged, along the (Oz) axis, with the value of the associated extraction wavelength which is all the lower as the distance between the planar waveguide and the support substrate 110 is reduced.

Advantageously, the planar waveguides $120_1$, $120_2$, $120_3$ and their diffraction gratings $130_1$, $130_2$, $130_3$ are each optimised to guide, respectively extract, light in a narrow spectral range, with an extent less than 0.1 µm. It can therefore be considered that each planar waveguide $120_1$, $120_2$, respectively $120_3$, is configured to receive a single wavelength, and that the number of wavelengths processed by the optical component is equal to the number of superimposed planar waveguides that it includes.

Figure 2:
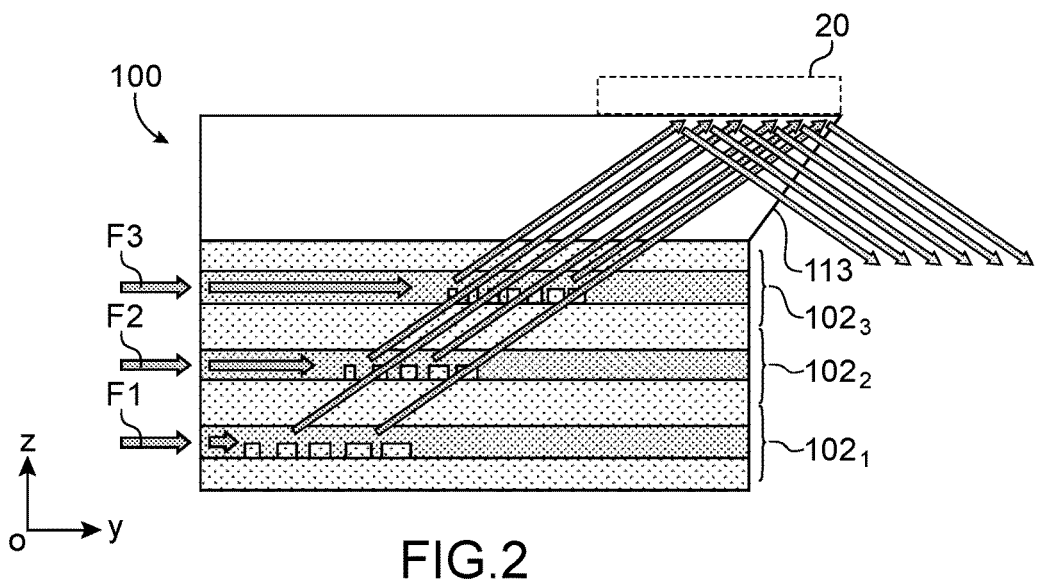
FIG. 2 schematically illustrates the optical component of FIGS. 1A and 1B, in use.

FIG. 2 schematically illustrates the optical component of FIGS. 1A and 1B, in use. Each of the planar waveguides $120_1$, $120_2$, $120_3$ receives as input a distinct light beam, referenced F1, F2 respectively F3. Each of the beams F1, F2, F3 is a monochromatic beam, centred on a wavelength $\lambda 1$, $\lambda 2$, respectively $\lambda 3$, here (but without limitation) a wavelength belonging to the infrared spectrum. The wavelengths $\lambda 1$, $\lambda 2$, $\lambda 3$ are all distinct from each other. These wavelengths $\lambda 1$, $\lambda 2$, $\lambda 3$ correspond to the extraction wavelengths associated with the planar waveguides $120_1$, $120_2$, respectively $120_3$.

Each planar waveguide $120_1$, $120_2$, respectively $120_3$, is capable of guiding the light at the wavelength $\lambda 1$, $\lambda 2$, respectively $\lambda 3$. In each planar waveguide $120_1$, $120_2$, respectively $120_3$, the light beam F1, F2, respectively F3 propagates to the diffraction grating $130_1$, $130_2$, respectively $130_3$. At the diffraction grating $130_1$, $130_2$, respectively $130_3$, the light of the light beam F1, F2, respectively F3 at the wavelength $\lambda 1$, $\lambda 2$, respectively $\lambda 3$ is extracted out of the diffraction grating $130_1$, $130_2$, respectively $130_3$. In FIG. 2, the light extracted by each of the diffraction gratings $130_1$, $130_2$, $130_3$ is shown by arrows.

The light extracted by the diffraction gratings $130_1$, $130_2$, $130_3$ then reaches the support substrate 110, undergoes a slight refraction at the interface between the upper low index layer $102_4$ and the support substrate 110 (not shown in FIG. 2, to simplify the Figure), passes through this support substrate 110, and reaches the upper face 112 of the latter, on the side opposite to the planar waveguides $120_1$, $120_2$, $120_3$. Simulations have shown that the light extracted from a planar waveguide is not disturbed by the crossing of the planar waveguides located above.

The upper face 112 of the support substrate 110 forms an exchange interface with a sample. In use, a sample is placed against this face 112. In FIG. 2, the area 20 intended to receive this sample has been surrounded with a dashed line.

The light extracted by the diffraction gratings $130_1$, $130_2$, $130_3$ arrives on this face 112 with an angle of incidence, such that it is entirely reflected and returns towards the inside of the support substrate 110. A small portion of the light arriving on the face 112 nevertheless escapes out of the support substrate 110, in the form of an evanescent wave, before returning towards the inside of the support substrate 110. When the sample is placed against this face 112, the evanescent wave therefore penetrates inside the sample, in a surface region of the latter, before returning to the inside of the support substrate 110. This evanescent wave is partially absorbed by the sample, with absorption wavelengths and absorption rates which depend on the chemical and biological composition of the sample.

The light returned by the face 112, including the evanescent wave having passed through the sample, then passes through the support substrate 110 and emerges from the latter via the transverse face 113 thus forming an exit face.

The support substrate 110 must therefore be transparent to the extraction wavelength values $\lambda 1$, $\lambda 2$, $\lambda 3$ associated with each of the planar waveguides $120_1$, $120_2$, $120_3$. It preferably has optical losses of less than 3 dB/cm at these wavelengths. Furthermore, the refractive index of the support substrate 110 must be strictly greater than the refractive index of the sample, in order to obtain a total reflection on the face 112. In practice, the refractive index of the 'support substrate is advantageously greater than or equal to 3, at the extraction wavelengths associated with the diffraction gratings of each of the planar waveguides. Preferably, the support substrate 110 further has a small difference in refractive index relative to the refractive index of the low index layers of the stack, at the extraction wavelengths associated with the diffraction gratings of each of the planar waveguides. This index difference is advantageously less than 0.5. A silicon support substrate 110 satisfies these conditions, in particular in the infrared. The invention is not, however, limited to this material. For use with visible light, the support substrate 110 can be, for example, made of diamond or glass ($SiO_2$, BF33, quartz, etc.) or of an optical polymer.

The optical component allows using distinct light sources to provide the light beams F1, F2, F3. Each of these light sources can thus be a monochromatic light source, offering a high optical power at the wavelength $\lambda 1$, $\lambda 2$, respectively $\lambda 3$. The light provided by each of the light sources can thus be distributed over a large surface, with at each point of said surface sufficient light energy to implement a measurement by attenuated total reflection. The optical component 100 therefore allows carrying out attenuated total reflection wide-field multispectral imaging. Instead of scanning the surface to be imaged, said surface can be imaged at one time. The distribution of light on the surface to be imaged is carried out by the optical component 100. The light propagating in the planar waveguides is dispersed along the (Ox) axis. Then, during its gradual extraction by the diffraction gratings, this light is further dispersed along the (Oy) axis.

The light is thus distributed according to a surface of interest, belonging to the upper face 112 of the support substrate. The length of this surface of interest, along the (Oy) axis, is preferably equal to the length l of the diffraction gratings along this same axis. Typical values for the length l are between 1000 µm and 2000 µm, for example 1500 µm. There is a relationship between the thickness of the support substrate and the length l, allowing being ensured that all light arriving on the surface of interest does indeed arrive on the transverse face 113 when it is reflected.

Preferably, each planar waveguide $120_1$, $120_2$, respectively $120_3$, is single-mode along the (Oz) axis, and at the corresponding extraction wavelength λ1, λ2, respectively λ3.

In practice, the light is extracted by the diffraction gratings in the direction of the support substrate, and in the opposite direction. In order to avoid destructive interference due to internal reflections of the extracted light in the direction opposite to the support substrate, the optical component may comprise an absorption layer or a diffusion surface, on the side opposite to the support substrate. Thus, the optical component 100 is advantageously frosted on the rear face, on the side opposite to the support substrate.

In each diffraction grating $130_1$, $130_2$, $130_3$, the light extraction takes place gradually, as the light propagates in the latter. Here, the light propagates in the diffraction grating $130_1$, $130_2$, respectively $130_3$, along the (Oy) axis, and the light is extracted by said grating as it propagates. At each point of the diffraction grating $130_1$, $130_2$, respectively $130_3$, along the (Oy) axis, the amount of extracted light is equal to the product of a local value of the extraction rate multiplied by the amount of remaining light, in the corresponding planar waveguide, at the location considered along the (Oy) axis. Thus, as the amount of light remaining in the planar waveguide decreases as the light propagates along the (Oy) axis, a constant value of the extraction rate in the diffraction gratings would lead to an inhomogeneous extraction of light along the (Oy) axis. Thus, advantageously, each of the diffraction gratings $130_1$, $130_2$, respectively $130_3$ has a local value of the extraction rate which varies monotonically along the (Oy) axis. In particular, the local value of the extraction rate increases as one moves away from an input edge of the corresponding planar waveguide, at which the light is injected. Each local value can be calculated on a single pattern of the diffraction grating, or be an average value relating to several neighboring patterns, for example less than five neighboring patterns. The local value of the extraction rate varies, along the (Oy) axis, according to a nonlinear law.

The value of the extraction rate of a diffraction grating is a function of a value of its fill factor. In each pattern of the considered diffraction grating, the fill factor is equal to the surface of the high index portion, divided by the total surface of the corresponding pattern, where said surfaces are defined in a cutting plane parallel to the plane (Oxy). The fill factor can also be considered as a volume ratio (volume occupied by the low index portion, divided by the total volume of the corresponding pattern). In particular, these two definitions are exactly equivalent for a diffraction grating is of constant depth. The extraction is all the higher as the fill factor is close to 50% (strongest index modulation). Consequently, advantageously, in each of the diffraction gratings $130_1$, $130_2$, $130_3$, a local value of the fill factor varies monotonically between 0% and 50%, or between 100% and 50%, from one end to the other of the diffraction grating and as one moves away from an input edge of the corresponding planar waveguide. Advantageously, the fill factor does not exceed 0.5 (50%). In this case, the higher the fill factor, the higher the extraction rate, and vice versa. Thus, advantageously, in each of the diffraction gratings $130_1$, $130_2$, $130_3$, a local value of the filling factor increases as one moves away from an input edge of the corresponding planar waveguide. In other words, in each of the diffraction gratings $130_1$, $130_2$, $130_3$, a local value of the fill factor increases along an axis of propagation of the light in said corresponding planar waveguide, and in the direction of propagation of light along this axis. Here again, each local value can be calculated on a single pattern of the diffraction grating, or be an average value relating to several neighboring patterns, for example less than five neighboring patterns.

In addition or alternatively, the variation in the extraction rate can be obtained using diffraction gratings whose depth varies along the (Oz) axis.

Figure 3:
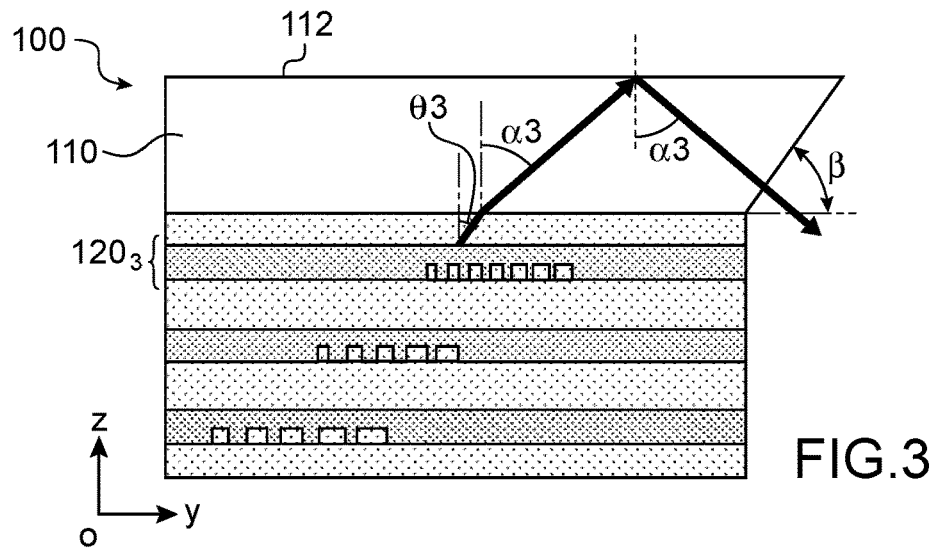
FIG. 3 schematically illustrates a light extraction angle, in the optical component of FIGS. 1A and 1B.

In each of the planar waveguides $120_1$, $120_2$, $120_3$, the diffraction grating $130_1$, $130_2$, $130_3$ is configured to extract light out of said planar waveguide, at the corresponding extraction wavelength λ1, λ2, respectively λ3, and in an extraction direction defined by an extraction angle θ1, θ2, respectively θ3. The extraction angles are each defined relative to the normal to the plane (Oxy) of the optical component 100. In FIG. 3, the extraction angle θ3 is shown, associated with the extraction of the light out of the planar waveguide $120_3$. At each planar waveguide $120_1$, $120_2$, respectively $120_3$, the value of the extraction angle at the extraction wavelength λ1, λ2, respectively λ3, is defined by the average pattern distribution pitch in the diffraction grating $130_1$, $130_2$, $130_3$. Preferably, the extraction angles θ1, θ2, θ3 all take the same value, denoted θ.

The value taken by the extraction angles is adapted so that the light extracted from the planar waveguides $120_1$, $120_2$, $120_3$ undergoes a total internal reflection at the upper face 112 of the support substrate, taking into account the refraction at the entry into the support substrate 110. In FIG. 3, the angle defining the direction of propagation of the light extracted by the diffraction grating $103_3$ is denoted by α3, after refraction at the entry into the support substrate 110 (at the interface between the upper low index layer and the support substrate 110). In other words, α3 denotes the extraction angle θ3, modified by refraction at the entry into the support substrate. The angle α3 is defined relative to the normal to the plane (Oxy). The diffraction gratings $130_1$, $130_2$, $130_3$ are each associated with a respective angle α1, α2, α3. Preferably, the angles α1, α2, α3 all take the same value denoted α.

Considering that the upper face 112 of the support substrate extends in a plane (Oxy), the angle of propagation of the light extracted out of a planar waveguide after refraction at the interface between the upper low index layer and the support substrate 110, is equal to the angle of incidence of this same light on the face 112. Thus, the value taken by the angles α1, α2, α3 (angles of extractions modified by refraction at the interface between the upper low index layer and the support substrate 110) must be strictly greater than a first critical angle of total internal reflection, at the interface between the support substrate and an external medium, at the face 112 of the support substrate. This first critical angle of total internal reflection is determined by the Snell-Descartes laws, and depends on the refractive index of the support substrate 110 and the refractive index of the medium placed against the face 112, in use. When this medium is air, the first critical angle of total internal reflection is approximately 17° if the support substrate 110 is silicon. This first critical angle of total internal reflection increases with the refractive index of the medium intended to be placed against the upper face 112. In practice, this medium is not air, but a sample consisting of a biological or chemical medium with an average refractive index strictly greater than unity.

Furthermore, the value taken by the extraction angles is adapted so that the light extracted from the planar waveguides $120_1$, $120_2$, $120_3$, and reflected on the upper face 112 of the support substrate, can emerge out of the support substrate when it arrives at the exit face 113. For this, this light must arrive on the exit face 113, with an angle of incidence strictly less than a second critical angle of total internal reflection. The second critical angle of total internal reflection is defined relative to the normal to the exit face 113. This second critical angle of total internal reflection is determined by Snell-Descartes laws, and depends on the refractive index of the support substrate 110 and the refractive index of the medium in contact with the exit face 113, in use. This medium is generally air, such that the second critical angle of total internal reflection is about 17° if the support substrate 110 is silicon.

In the example shown in FIG. 3, the exit face 113 is inclined at an angle β relative to the plane (Oxy). Here, the support substrate 110 is made of crystalline silicon, and the angle β is equal to 54.74°, which corresponds to an anisotropic etching angle of a crystalline plane (plane 111) in a face-centred cubic type crystal (for example silicon) or in a diamond-type square mesh crystal.

In order to simplify, the optical component 100 is configured such that the light extracted from the planar waveguides $120_1$, $120_2$, $120_3$, and reflected on the upper face 112 of the support substrate, arrives on the exit face 113 of the support substrate at normal incidence (i.e. an angle of incidence as defined above which takes the value zero). For this, the angle of incidence α of the light on the upper face 112 of the support substrate must be equal to β, here equal to 54.74. The value taken by the extraction angles modified by refraction at the interface between the upper low index layer and the support substrate 110 is therefore equal to β, here equal to 54.74°. This value is strictly greater than any first critical angle of total internal reflection associated with a medium placed against the face 112 of the support substrate having a refractive index less than or equal to about 2.8.

Alternatively, it is possible to have β equal to 45° (plane 110 of a face-centred cubic crystal).

The invention is not limited to this example, and covers all other combinations of angle of extraction and angle of inclination of the exit face 113, allowing obtaining the desired path of the light.

Figure 4:
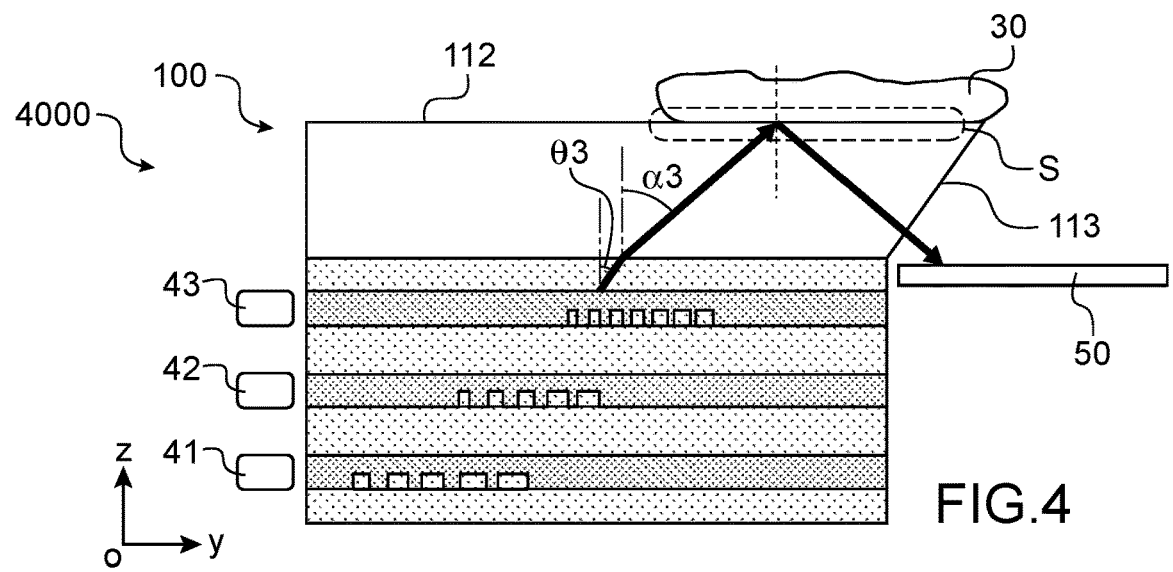
FIG. 4 schematically illustrates a first embodiment of an optical system, including the optical component of FIGS. 1A and 1B.

FIG. 4 schematically illustrates a first embodiment of an optical system 4000, including the optical component 100 of FIGS. 1A and 1B.

The optical system 4000 includes, in addition to the optical component 100, a plurality of elementary light sources 41, 42, 43, each configured to emit the light beam F1, F2, respectively F3 as shown in FIG. 2. Each of the elementary light sources 41, 42, 43 is optically coupled with a respective one of the planar waveguides of the optical component 100. The injection of light here takes place through the wafer of the optical component 100. Each of the elementary light sources 41, 42, 43 is constituted here by a quantum cascade laser, that is to say a monochromatic light source offering a high optical power at the wavelength λ1, λ2, respectively λ3. Alternatively, the elementary light sources can comprise one or more light-emitting diode(s).

The light emitted by the elementary light sources 41, 42, 43 is distributed by the optical component 100 on the surface of interest S belonging to the upper face 112 of the support substrate. In use, a sample 30 is placed against the upper face 112 of the support substrate, at said surface of interest S.

In the example illustrated in FIG. 4, the optical system 4000 further includes a detector 50, which extends parallel to a plane (Oxy), on the side of the optical component 100 opposite to the elementary light sources 41, 42, 43. A detection surface of the detector 50 is preferably a square or a rectangle, with a side comprised between 1 mm and 10 mm. The detector 50 is of the matrix type. It is sensitive to each of the extraction wavelengths λ1, λ2, and λ3, associated with the diffraction gratings of each of the planar waveguides of the optical component 100. The detector 50 is preferably a matrix infrared detector, for example a bolometer matrix, or a photodiode matrix. Alternatively, the detector 50 can be sensitive in the visible, consisting for example of a photodiode matrix. The detector 50 is configured to receive the light emerging from the optical component 100 through the exit face 113.

The detector 50 is placed very close to the exit face 113, without imaging optics therebetween. Advantageously, a distance along (Oz) between the detector 50 and the face 112 is comprised between 100 μm and 1.5 μm. This distance may be equal to the thickness along (Oz) of the optical component 100, the latter then being able to be used as a spacer between the sample and a detection module including the detector 50.

Figure 5:
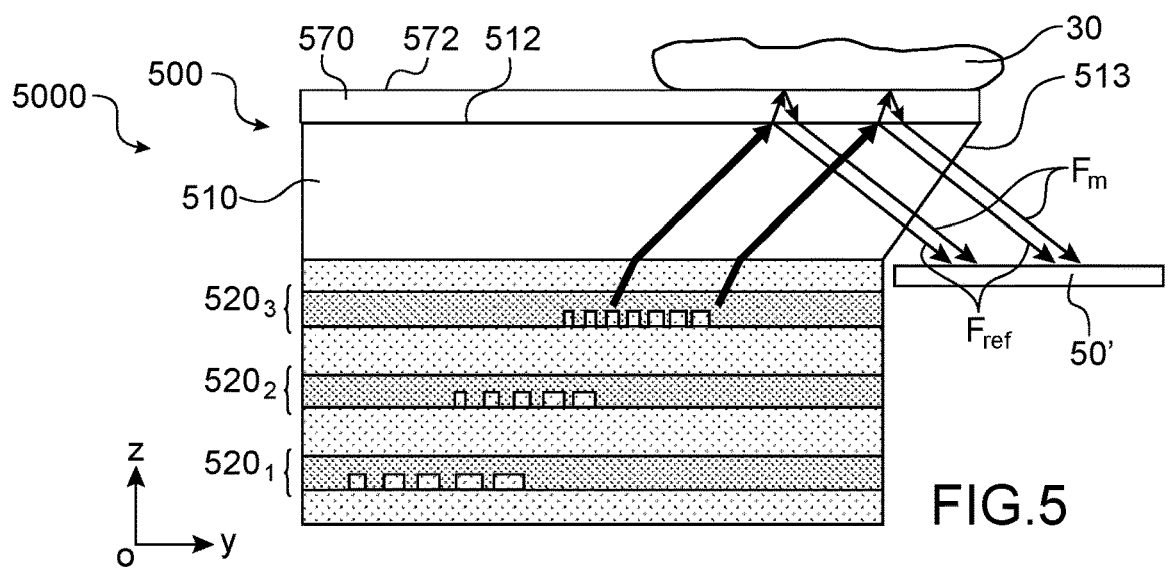
FIG. 5 schematically illustrates an optical component according to a second embodiment.

FIG. 5 schematically illustrates an optical system 5000 including an optical component 500 according to a second embodiment, as well as a matrix detector 50' such as that of FIG. 4.

The optical component 500 differs from that of FIGS. 1A and 1B only in that it further includes a beam splitting layer 570, placed against the upper face 512 of the support substrate 510, on the side opposite to the planar waveguides. The beam splitting layer 570 is transparent to the extraction wavelength values λ1, λ2, λ3 associated with each of the planar waveguides $520_1$, $520_2$, $520_3$. It preferably has optical losses of less than 3 dB/cm at these wavelengths. The beam splitting layer 570 further has a refractive index distinct from that of the support substrate (at wavelengths λ1, λ2, λ3). It preferably has a high refractive index, for example strictly greater than 2. Its refractive index may however be lower than that of the support substrate 510. The beam splitting layer 570 is for example made of germanium, an SiGe alloy, a ZnS alloy, or any other material satisfying these two conditions. The thickness of the beam splitting layer 570 is preferably comprised between 1 μm and 20 μm, for example equal to 10 μm.

In operation, the sample 30 is placed against at least one portion of the upper face 572 of the beam splitting layer 570, on the side opposite the planar waveguides $520_1$, $520_2$, $520_3$. The light arriving at the upper face 512 of the support substrate 510 is partly reflected, and partly transmitted, according to the Fresnel formula.

The reflected light then propagates directly to the exit face 513 of the support substrate, at which it emerges out of the optical component 500.

The transmitted light is refracted, and propagates to the upper face 572 of the beam splitting layer 570. Similarly to what has been described with regard to the first embodiment, this light is reflected at this upper face 572, at the interface between sample 30 and beam splitting layer 570. At said interface, an evanescent wave circulates in a surface region of sample 30, where it is partially absorbed. The light reflected at said interface passes through beam splitting layer 570 again, then enters the support substrate 510 and emerges from support substrate 510 at the exit face 513.

The light having been reflected at the interface between the support substrate 510 and the beam splitting layer 570, and emerging from the support substrate 510, forms a reference beam Fref. The light having been transmitted to the interface between the support substrate 510 and the beam splitting layer 570, and finally emerging from the support substrate 510, forms a measurement beam Fm. The measurement beam Fm includes the evanescent wave having circulated in the sample 30. The measurement beam Fm and the reference beam Fref interfere with each other, and the interference is detected and measured by the matrix detector 50'.

This second embodiment allows analysing the sample on the principle of the attenuated total reflection multispectral imaging, not based on an absorption measurement, as in the first embodiment, but based on a phase measurement. This alternative is particularly advantageous when an analysis directly based on the absorption is not well adapted. These are in particular cases in which the sample includes a large amount of water molecules and a small amount of third molecules, and where the absorption by the third molecules is negligible relative to the absorption by the water molecules, such that an analysis based directly on the absorption would not allow detecting third molecules. The analysis based on a phase measurement is based on the idea that an absorption peak induces an index step, and therefore a phase step.

Figure 6A:
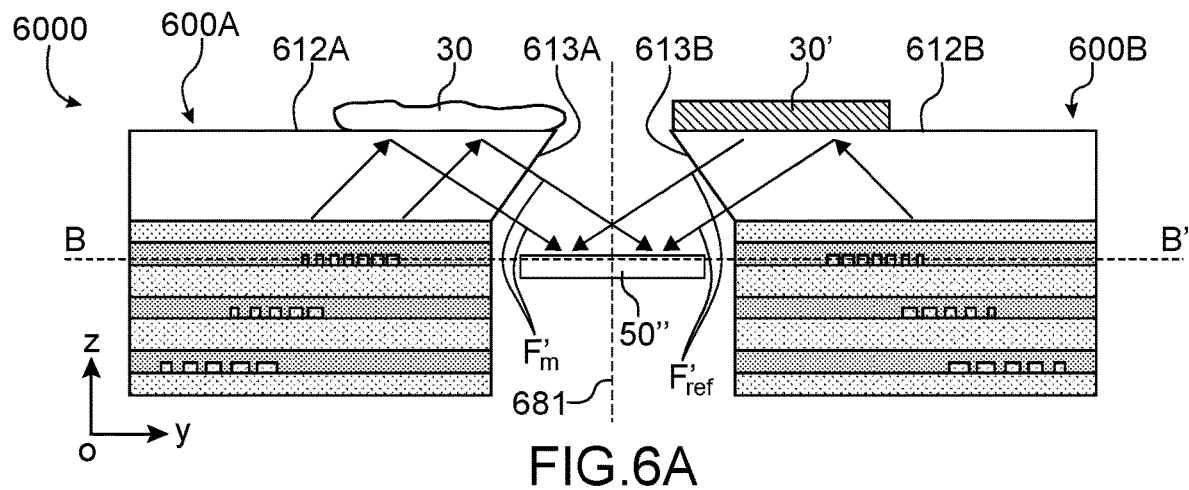
FIGS. 6A and 6B schematically illustrate, respectively in a sectional view in a vertical plane and in a sectional view in a horizontal plane, an optical system according to a second embodiment.
Figure 6B:
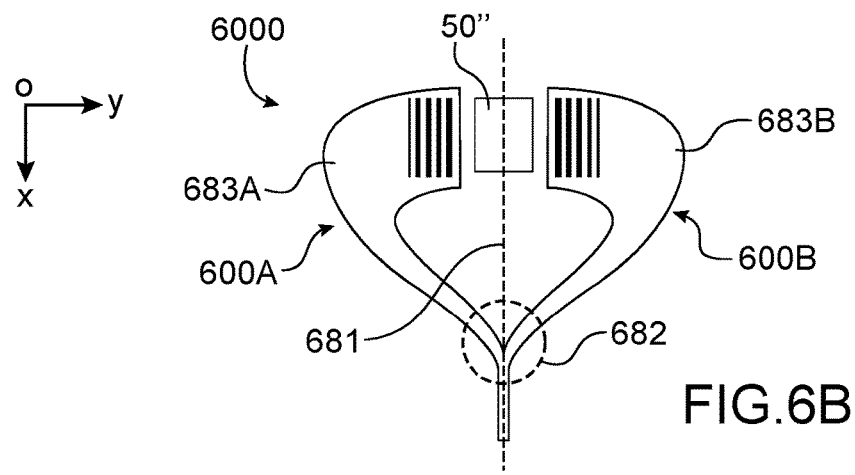

FIGS. 6A and 6B schematically illustrate an optical system 6000. FIG. 6A illustrates the optical system 6000, in a sectional view along a vertical plane parallel to the plane (Oyz). FIG. 6B illustrates the optical system 6000 in a sectional view along a horizontal plane BB' parallel to the plane (Oxy).

The optical system 6000 is a variant of the system of FIG. 5, for analysing the sample 30 on the principle of the attenuated total reflection multispectral imaging, based on a phase measurement.

The 6000 system includes in particular:
- a first optical component 600A, such as that of FIGS. 1A and 1B; and
- a second optical component 600B, such as that of FIGS. 1A and 1B.

The first optical component 600A extends parallel to a plane (Oxy) called first plane of the optical component. It includes an exit face 613A, from which the light, in operation, emerges.

The second optical component 600B also extends parallel to plane (Oxy). It includes an exit face 613B, from which the light, in operation, emerges.

The first optical component 600A and the second optical component 600B are here arranged symmetrical to each other, relative to a plane of symmetry 681 which extends parallel to the plane (Oxz) (therefore orthogonal to the first plane of the optical component). The first optical component 600A and the second optical component 600B are arranged spaced apart from each other, on either side of the plane of symmetry 681, with their respective exit faces 613A, 613B facing each other.

The optical system 6000 further includes an optical splitter 682 and two guide arms 683A, 683B.

The optical splitter 682 forms a splitter, configured to distribute light, arriving through a single entry path, into two exit paths. The optical splitter 682 consists of several superimposed stages, where each stage has an entry and two exits.

Likewise, the two guide arms 683A, 683B each consist of several superimposed stages. Each stage of optical splitter 682 is configured to distribute light to a respective stage of the guide arm 683A and to a respective stage of the guide arm 683B.

One of the guide arms, 683A, includes the first optical component 600A. The other of the guide arms 683B, includes the second optical component 600B.

In practice, the two optical components 600A, 600B, the two guide arms 683A, 683B and the optical splitter 682 are formed together in the same stack of high index layers and low index layers. Each stage of the optical splitter 682 is formed in a respective high index layer, and surrounded by the material of the low index layers. Likewise, each stage of each of the two guide arms 683A, 683B is formed in a respective high index layer, and surrounded by the material of the low index layers. Each stage of each of the two guide arms 683A, 683B, made of high index material, gradually widens in the plane (Oxy), from an edge attached to the optical splitter to an edge of the optical component 600A or 600B. FIG. 6B shows a sectional view of the System 6000, passing through the upper high index layer of the layer stack. Here, the optical system 6000 has a planar symmetry relative to the plane 681.

Here, the optical system 6000 further includes a matrix detector 50" as described with reference to FIG. 4. The latter extends in a plane parallel to the plane (Oxy), between the output faces 613A, 613B of the first and second optical components.

In operation, the sample 30 is placed against at least one portion of the upper face 612A of the support substrate of the first optical component 600A. Furthermore, a reference sample 30', made of a known material, is placed against at least one portion of the upper face 612B of the support substrate of the second optical component 600B.

The light arriving at the input of the optical splitter 682 is distributed in each of the two guide arms 683A, 683B, preferably with the same amount of light sent to each guide arm. The light propagates in the guide arm 683A, respectively 683B, to the first optical component 600A, respectively to the second optical component 600B.

In the first optical component 600A, the light behaves as in the optical component of FIGS. 1A and 1B, and emerges through the exit face 613A including an evanescent wave having circulated in the sample 30. The light emerging from the exit face 613A forms a measurement beam F'm.

Similarly, in the second optical component 600B, the light behaves as in the optical component of FIGS. 1A and 1B, and emerges through the exit face 613B including an evanescent wave having circulated in the reference sample 30'. The light emerging from the exit face 613B forms a reference beam F'ref.

The measuring beam F'm and the reference beam F'ref interfere with each other, and the interference is detected and measured by the matrix detector 50". This embodiment thus constitutes a second means for carrying out the attenuated total reflection multispectral imaging, from phase measurements.

In use, elementary light sources are optically coupled to the optical splitter 682, upstream of the guide arms in the direction of light circulation in the optical system. Each light source is coupled to a respective stage of the optical splitter 682.

A moiré phenomenon occurs when an interference pattern is downsampled, and results in the detection of interference fringes which are higher than the actual interfringe value. The detected fringes then have a Moiré interfringe, greater than the dimensions of the detector, thus preventing any measurement of the interfringe. In a variant not shown, the two optical components are not completely symmetrical to each other relative to the plane 681. This allows, thanks to the moiré phenomenon, to obtain on the matrix detector interference fringes whose interfringe is compatible with the dimensions of the detector. Fringes can thus be observed, even with a matrix detector whose spatial sampling is not fine enough to resolve the theoretical interference fringes. Thus, the first optical component is configured so that the light emerges through the exit face thereof, oriented at an angle θA relative to the plane (Oxy). The second optical component is configured so that the light emerges from the exit face thereof, oriented at an angle θB relative to the plane (Oxy), with the angles θA and θB distinct from each other in absolute value. For this, the two optical components can have the respective exit faces thereof which are not symmetrical relative to the plane 681, and/or distinct diffraction grating pitches two by two, from one optical component to the other, and for the same considered extraction wavelength. The difference between θA and θB, in absolute value, is advantageously less than 1'. A slight translation of the light beam emerging from the misaligned optical component can be compensated for by a translation of the extraction networks in the latter. This asymmetry allows, thanks to the moiré phenomenon, to obtain interference fringes on the matrix detector whose fringe is compatible with the spatial sampling and the dimensions of the latter.

Figure 7:
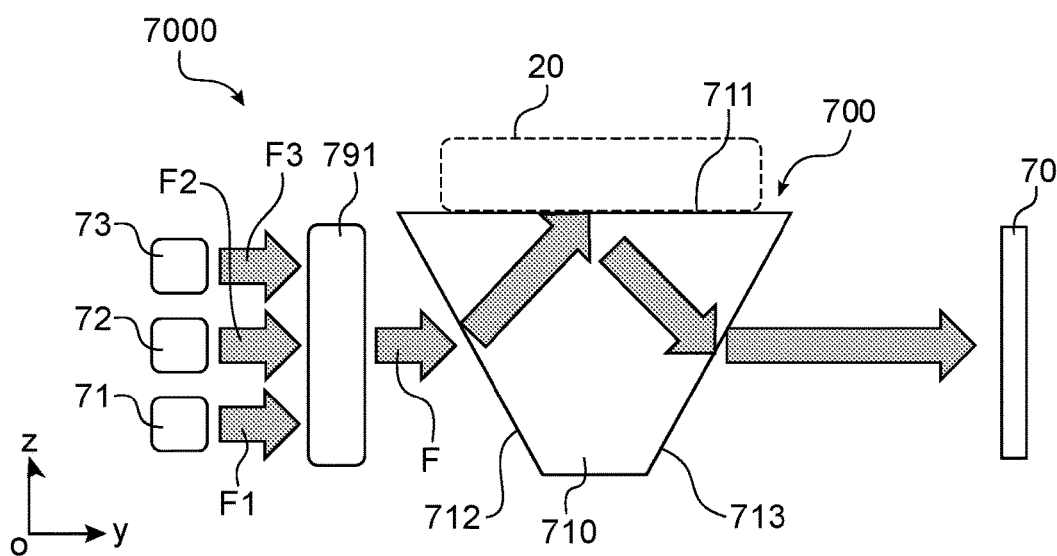
FIG. 7 schematically illustrates an optical component which can offer advantages comparable to the advantages offered by the optical component.

FIG. 7 finally schematically illustrates an optical system 7000 and optical component 700 which can offer advantages comparable to the advantages offered by the invention.

In this system, the optical component 700 for an attenuated total reflection multispectral imaging device, simply includes an optical prism 710. The prism 710 is a solid component, made of a material that is optically transparent at the used wavelengths, preferably with optical losses of less than 3 dB/cm at the wavelengths that it is intended to receive. The prism 710 is for example made of silicon, for use with infrared light. Other materials are also possible, for example diamond, a glass ($SiO_2$, BF33, quartz, etc.) or an optical polymer, for applications in the visible.

The shape of the prism 710 is that of a right-angled prism, truncated in a plane parallel to the base thereof, and called "Dove prism". The prism 710 has a support face 711, parallel to the plane (Oxy). In use, a sample to be analysed is placed against the support face 711. In FIG. 7, the area 20 intended to receive this sample has been surrounded with a dashed line. The prism 710 further includes a first transverse face 712, and a second transverse face 713, together defining a right angle.

The 7000 optical system further includes:
  a plurality of elementary light sources 71, 72, 73, here three in number;
  a wavelength multiplexer 791; and
  a matrix detector 70.

The elementary light sources 71, 72, 73 are each configured to emit the light beam F1, F2, respectively F3. Each of the light beams F1, F2, F3 is a monochromatic light beam, centred on a distinct wavelength value belonging, for example, to the infrared spectrum or to the visible spectrum. Each of the elementary light sources 71, 72, 73 is constituted here by a quantum cascade laser, that is to say a monochromatic light source offering a high optical power at its emission wavelength. The light beams F1, F2, F3 are all sent to the input of the wavelength multiplexer 791. The wavelength multiplexer 791 includes here at least as many inputs as there are elementary light sources 71, 72, 73, and a single output which returns a light beam F. The light beam F can be polychromatic, if all elementary light sources 71, 72, 73 are illuminated at the same time. Alternatively, the different elementary light sources 71, 72, 73 are illuminated in turn, and the light beam F is at each instant a monochromatic beam. The light beam F propagates to the first transverse face 712, preferably by propagating in a plane parallel to the plane (Oxy).

At the first transverse face 712, the light beam F is refracted in the direction of the support face 711, and arrives on the support face 711 with an angle of incidence strictly greater than a critical angle of total internal reflection. This angle is determined by the Snell-Descartes laws, and depends on the refractive index of the prism 710 and the refractive index of the medium placed against the support face 711, in use. When this medium is air, this angle is about 17° if the prism 710 is made of silicon. In practice, this medium is not air, but a sample with an average refractive index strictly greater than unity.

The light beam F is thus entirely reflected on the support face 711, however with an evanescent wave which circulates in a sample placed against said support face, according to the principle of the attenuated total reflection. The light beam F reflected on the support face 711 then propagates inside the prism 710 to the second transverse face 713, then emerges out of the prism 710 at the latter. It is then received by the matrix detector 70. The matrix detector 70 is sensitive to at least one wavelength intended to be injected at the input of the prism 710. The matrix detector 70 is preferably an infrared matrix detector, for example a bolometer matrix, or a photodiode matrix. Alternatively, the matrix detector 70 can be sensitive in the visible, consisting for example of a photodiode matrix. The matrix detector 70 in a plane orthogonal to the plane (Oxy) (here a plane (Oxz)).

This embodiment allows implementing attenuated total reflection multispectral imaging, and using light sources each offering high optical power at their emission wavelength. The light provided by each of the light sources can thus be distributed over a large surface, with at each point of said surface sufficient light energy to implement a measurement by attenuated total reflection. It is possible to obtain a wide-field multispectral image of a sample, without displacement of the sample relative to the support face 711. The acquisition time of the wide-field multispectral image is therefore greatly reduced, in comparison with the prior art.

An optical system, not shown, is also described which includes:
  an optical component (or as illustrated in FIG. 7);
  an associated matrix detector (see FIGS. 4 to 6B, or even FIG. 7);
  possibly elementary light sources such as illustrated in FIG. 4 (or in FIG. 7); and
  a computer, connected to the matrix detector, configured to receive, as input, light intensity measurements provided by the matrix detector, and to output a multispectral image of a sample.

The multispectral image is for example a distribution map of absorption values for different predetermined wavelengths, or a distribution map of phase shift values for different predetermined wavelengths.

A method for using an optical component and an optical system (or as illustrated in FIG. 7) is also described, to obtain a wide-field multispectral image of a sample. The method implements the following steps:
  a sample is placed against a support face of the optical component;
  the sample is illuminated using a plurality of light beams, each at a different wavelength, via said optical component;
  the light emerging from the optical component is recovered, to form a wide-field multispectral image of the sample, where said image is a distribution map of absorption values for different predetermined wavelengths, or a distribution map of phase shift values for different predetermined wavelengths.

Preferably, the method does not include any scanning step to displace the optical component as many times as there are points on said map.

The optical compound can be made from a first silicon substrate. Successive epitaxies are made on this first substrate, to form the stack of low index and high index layers, with partial anisotropic etchings to form the diffraction gratings. A second silicon substrate is attached to the stack, on the side opposite the first substrate, then the first substrate is removed. The second substrate has a transverse face oriented obliquely, forming the exit face of the optical component. This transverse face is formed before the transfer to the stack, for example by anisotropic etching or by a molding and stamping method. The obtained optical compound is therefore a component integrated on silicon, for ATR imaging.

In a particular embodiment, the optical component includes four superimposed planar waveguides, associated respectively with the extraction wavelengths $\lambda 4=6.04$ µm, $\lambda 3=7.25$ µm, $\lambda 2=8.10$ µm, $\lambda 1=9.26$ µm. The planar waveguide associated with the wavelength $\lambda 4$ is the closest to the support substrate. The respective thicknesses of the core layers of said planar waveguides are respectively e4=1.6 µm, e3=2.0 µm, e2=2.2 µm, e1=2.5 µm. Each of the planar waveguides is thus single-mode in the vertical direction, and at the associated extraction wavelength. The thicknesses of the low index layers above each core layer are respectively E4=4.1 µm, E3=4.7 µm, E2=5.3 µm, E1=6.0 µm. Crosstalk losses are thus limited between two neighboring planar waveguides. The exit face is inclined at 54.74° relative to a plane (Oxy), and the light is extracted from the planar waveguides at an extraction angle also equal to 54.74° after refraction at the interface between the upper low index layer and the support substrate. For this, the pitch of the diffraction gratings is respectively P4=5.48 µm, P3=6.51 µm, P2=7.30 µm, P1=8.35 µm.

The invention is not limited to the described examples, and covers many other variations, in particular with different materials, a different number of planar waveguides, different extraction wavelengths, etc. There may possibly be intermediate layers between the low index and high index layers of the stack of layers and/or between the support substrate and the stack. In the described examples, the patterns of the diffraction gratings extend along straight lines parallel to each other. Alternatively, these patterns can extend along convex curved lines. The curves are not necessarily identical over the entire length of the diffraction grating. It may be advantageous to have patterns which do not have the same curvature in front of or behind the considered diffraction grating. According to other variants, the gratings can be two-dimensional diffraction gratings, allowing illuminating the sample to be analysed under two different polarisations. According to yet other variants, the exit face is not flat, but curved, for example to cause the light emerging from the optical component to diverge. In this case, an angle of inclination of the exit face is defined by considering a plane connecting two ridges delimiting said exit face.

The invention allows, for example, carrying out the multispectral ATR imaging, for example in the infrared. It allows carrying out chemical or biological analyses of sample, by spectroscopy, and quickly obtaining wide-field images with compact instrumentation. It finds particular application in the field of health and the food industry.

The invention claimed is:

1. An optical component for an attenuated total reflection multispectral imaging device, comprising a support substrate and at least two planar waveguides, and:

each of the planar waveguides extends in a respective plane, with said respective planes parallel to each other and parallel to a plane of the optical component;

the planar waveguides and the support substrate are superimposed together along an axis orthogonal to the plane of the optical component, with the support substrate which covers the planar waveguides;

each of the planar waveguides comprises at least one diffraction grating, to extract light out of said planar waveguide;

at least two of the planar waveguides have their respective diffraction gratings which have values of the average pattern distribution pitch which are distinct from each other;

the support substrate comprises, on one side opposite the planar waveguides, a face configured to form an exchange interface with a sample and to be incident to the light extracted from the planar waveguides; and an exit face of the optical component corresponds to a lateral face of the support substrate arranged so that the light extracted from the planar waveguides and reflected by total reflection in the support substrate at the face configured to form the exchange interface emerges from the optical component through this exit face.

2. The optical component according to claim 1, wherein each of the planar waveguides comprises a core layer interposed between two cladding layers, and in each of the planar waveguides, the at least one diffraction grating consists of high index portions and low index portions, with the high index portions made of the material of the core layer and the low index portions made of the material of the cladding layers.

3. The optical component according to claim 2, wherein, in each of the planar waveguides, the at least one diffraction grating has a local value of the fill factor which varies monotonically along an axis of propagation of the light in said planar waveguide and in the direction of propagation of the light along this axis, the local value of the fill factor thus gradually approaching the value 0.5, with the fill factor which designates a ratio between a surface occupied by the low index portion in a pattern of the diffraction grating and a total surface occupied by said pattern, said surfaces being defined in a cutting plane parallel to the plane of the optical component.

4. The optical component according to claim 1, wherein the planar waveguides are arranged in decreasing order of an associated extraction wavelength value, with the extraction wavelength value which decreases at the same time as the distance between the planar waveguide and the support substrate decreases.

5. The optical component according to claim 1, wherein the support substrate is transparent to values of the extraction wavelength which are associated with the diffraction gratings of each of the planar waveguides.

6. The optical component according to claim 1, wherein a refractive index of the support substrate is greater than or equal to 3, at a maximum wavelength among extraction wavelengths associated with the diffraction gratings of each of the planar waveguides.

7. The optical component according to claim 1, wherein the exit face is oriented transverse relative to the plane of the optical component.

8. The optical component according to claim 1, wherein, in each of the diffraction gratings, the value of the average pattern distribution pitch is adapted to extract a light beam at a determined value of extraction wavelength, and according to an extraction angle defined relative to the normal to the plane of the optical component, with the same value of the extraction angle for all diffraction gratings and with said value of the extraction angle, modified by refraction at the entry into the support substrate, which is greater than a critical angle of total internal reflection at an interface between the support substrate and an external medium.

9. The optical component according to claim 8, wherein said value of the extraction angle, modified by refraction at the entry into the support substrate, is greater than or equal to 45°.

10. The optical component according to claim 8, wherein the exit face is oriented transverse relative to the plane of the optical component, with an angle β between the plane of the optical component and said exit face, which is substantially equal to the value of the extraction angle modified by refraction at the entry into the support substrate, to within plus or minus 5°.

11. The optical component according to claim 1, further comprising a beam splitting layer, superimposed on the support substrate on the side opposite to the planar waveguides, transparent to extraction wavelength values associated with the diffraction gratings of each of the planar waveguides, and of refractive index distinct from that of the support substrate.

12. The optical system comprising an optical component according to claim 1, as well as a plurality of elementary light sources, where each elementary light source is optically coupled to a respective one of the planar waveguides and capable of emitting a monochromatic light beam of spectrum centred on an extraction wavelength value associated with said planar waveguide.

13. The optical system according to claim 12, further comprising a matrix detector, sensitive to extraction wavelength values associated with the different planar waveguides, and configured to receive light emerging from the support substrate after it has been emitted by the elementary light sources and has circulated in the optical component.

14. The optical system according to claim 13, further comprising a computer, configured to receive as input light intensity measurements provided by the matrix detector, and to output a multispectral image of a sample.

15. The optical system according to claim 13, wherein said optical component forms a first optical component, and wherein the optical system further comprises:
- a second optical component, with the first optical component and the second optical component which are spaced apart from each other and which have the respective exit faces thereof facing each other; and
- an optical splitter and two guide arms, with the optical splitter configured to distribute the light on each of the two guide arms, with a first one of the guide arms which is capable of guiding the light from the optical splitter to the first optical component and with a second one of the guide arms which is capable of guiding the light from the optical splitter to the second optical component;
- and wherein the first and second optical components are configured and positioned symmetrically such that, when a sample intended to be analysed is disposed on the face configured to form the exchange interface of the first optical component and that a reference sample is disposed on the face configured to form the exchange interface of the second optical component, the light emerging from the exit face of the first optical component and the light emerging from the exit face of the second optical component can interfere and form an interference pattern for each wavelength in the space between the two optical components so as to be able to be detected by the matrix detector.

* * * * *